United States Patent

[11] 3,614,325

[72] Inventors John N. Galian
Trumbull;
Bruce C. Kuryla, Milford, both of Conn.
[21] Appl. No. 28,597
[22] Filed Apr. 15, 1970
[45] Patented Oct. 19, 1971
[73] Assignee Totel Systems Corporation
Bridgeport, Conn.

[54] TELEPHONE AND SIGNALING SYSTEM
10 Claims, 3 Drawing Figs.

[52] U.S. Cl. .......... 179/2 R
[51] Int. Cl. .......... H04m 11/02
[50] Field of Search .......... 179/1 H, 1 MN, 2 R, 2 A, 3, 4, 37, 81, 81 C, 84 L; 340/366, 372, 378, 294, 324, 332

[56] References Cited
UNITED STATES PATENTS
1,358,720 11/1920 Friendly .......... 179/2 R

*Primary Examiner*—Ralph D. Blakeslee
*Attorney*—Johnson & Kline

ABSTRACT: A system for selectively providing connection of a telephone at a location to either a telephone substation for communication or to a signaling system with the system having an indicator and the telephone being used to alter the condition of the indicator. The system is preferably used where there are many locations, hence many telephones and with an indicator for each telephone with each telephone being capable of only controlling its indicator when the telephone is connected to the signaling system. The indicators are preferably grouped at at least one master area which also includes the control over the connection of each telephone.

INVENTORS
John N. Galian
Bruce S. Kuryla
BY Johnson and Kline
ATTORNEYS

TELEPHONE AND SIGNALING SYSTEM

While the telephone and signaling of the present invention has applications of general utility it is preferably utilizable in a building wherein there are a plurality of separate locations and it is desired to optionally provide either telephonic communication between a telephone located at each location and a telephone substation or to provide an indication from the location of a condition that exists at the location to a master area. One such type of building is a hotel or motel having a plurality of rooms and it is desired to not only provide each room with its own telephone but also to provide signaling between the front desk, the housekeeping control center and a housekeeper of the status or condition of each room.

In a normal operation of a hotel, especially one having many locations, it has been found to become increasingly difficult to provide an instantaneous indication of the condition of each room to the various employees who need such information. Thus the front desk and the housekeeping center should have communicated to them the status of each room which at least indicates whether or not it is occupied, if it is empty but should be cleaned, if it is cleaned and ready for occupancy or if it is being cleaned in order to minimize the possibility of error and confusion.

Though it is possible to transfer such information verbally or in writing, it has heretofore been suggested that a signaling system be employed to provide an indication of the status of each room. Such a system would include a panel at the front desk and a panel at each housekeeping control center with each panel having indicating means such as signal lamps for each room under their control. The condition of the signal lamps, thus provides an indication of the present status of each room. Moreover, control over the indicating means should be available wherever information is present which could alter the status of the room and such areas have been found to be at least the front desk and each room. Accordingly, in order to provide such a system it has been found necessary to electrically interconnect the various indicating means and information sources generally by wires.

In such a system, one of the major costs consists of locating the wires throughout the building in order to interconnect the various points. In new construction, the cost is usually within economic feasibility, however, the cost of placing the wires in an existing building has been found to be quite expensive and hence economically limited the utilization of this type of signaling system in existing structures.

In most structures, both new and existing, where such a signaling system could be advantageously utilizable, it has been found that a telephone system is also contemplated or in use. Each location, for example a room if the building is a hotel, has a telephone and its own wires that interconnect it with a telephone substation for enabling telephonic communication to the room. If a signaling system is additionally desired then individual wires also are required to be installed from each room to a central location. Each system would thus be independent of each other but yet each have the expense of installing the connecting wires.

It is accordingly an object of the present invention to provide a telephone system and a signaling system in which the electrical connections in both systems include wires that are common to both systems.

Another object of the present invention is to achieve the above object and provide for selecting which system is to be in use while electrically isolating the other system therefrom.

A further object of the present invention is to provide a combined telephone and signaling system in which a telephone may be used for normal communication when the system is providing telephonic communication and in which the telephone is also utilized when the system is used as a signaling system to impart information into the signaling system.

Still another object of the present invention is to achieve the above objects in a combined telephone and signaling system which includes a plurality of separate locations, each of which has a telephone and in which each telephone may be selected independently of the other telephones to function in either the telephone or the signaling system.

Another object of the present invention is to provide a telephone and signaling system which is extremely economical to fabricate and install compared to heretofore known systems for providing the same functions and which is reliable and durable in use.

In carrying out the present invention, there is provided a conventional telephone system of a type that may, for example, be installed by a telephone company and having a telephone substation connectable with a plurality of remotely located telephones. Each of the latter are spaced at separate locations and a pair of wires interconnect each telephone to the substation. The telephone is of conventional construction having a manually operable receiver which, when in use enables a switch to electrically connect the two wires while in its nonuse position, i.e., resting on its base, it causes the switch to break the connection between the two wires.

The signaling system in the embodiment herein described is specifically shown as applied to a hotel or motel having a telephone located in each room, a front desk and a housekeeper control center. An indicating panel is positioned at the front desk and includes a pair of indicating lights for each room together with a manually operable switch for enabling the front desk to shift to either the telephone system or the signaling system. The housekeeping center also has a panel but it just includes a pair of indicating lights for each room. The condition of the indicating lights is used to indicate the status of the room, i.e. needs cleaning, being cleaned, room cleaned and ready for renting, room occupied, etc.

When the system is used as a signaling system it is necessary that information be received from each room and in accordance with the present invention this information utilizes the telephone to effect transmittal of information. Thus, when the room is being cleaned, the maid lifts the telephone receiver from its base to cause one condition of the indicating lights to be achieved while when she has completed the cleaning she merely replaces the receiver to cause another condition to occur. Thus the telephone completely eliminates the necessity of having other and different special switching arrangements required to be connected in each room to effect changes in the indicating means.

Other features and advantages will hereinafter appear.

Figures 1, 2, 3:
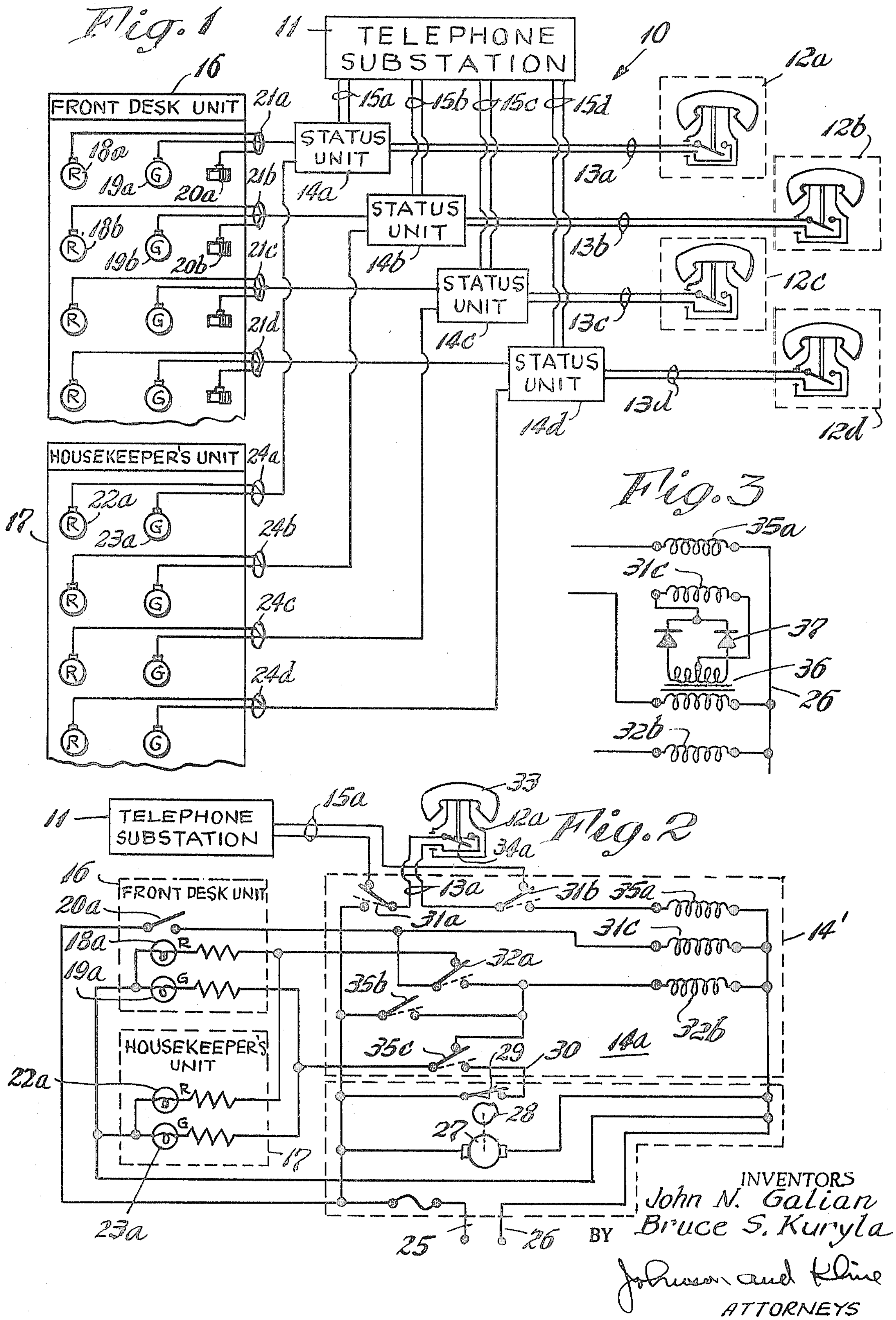
FIG. 1 is a diagrammatic representation of the combined telephone and signaling system of the present invention.
FIG. 2 is an electrical schematic diagram of the interconnection and components required at one location.
FIG. 3 is a portion of an electrical schematic diagram of a further embodiment showing a different manner of energization of a relay coil.

Referring to the drawing, the telephone and signaling system is generally indicated by the reference numeral 10 and includes a telephone substation 11 to which are connected a plurality of telephones **12*a*, 12*b*, 12*c* and 12*d*. The telephone 12*a* is connected by a pair of wires 13*a* to a status unit 14*a* which also has a pair of wires 15*a* connected to the telephone substation 11. Similarly, each of the other telephones 12*b* through 12*d* has wires 13*b–d*, status units 14*b–d* and wires 15*b–d***, respectively with only the components having the same letter in their reference character being connected together.

The telephone substation 11 and the telephones 12 are of conventional construction such that when the wires **13*a* and 15*a* are connected together they form a communications system between the telephone 12*a* and the telephone substation 11. Similarly the remaining telephones when connected through their respective wires to the telephone station also permit communication between the telephone and the substation. The substation may be, if in a hotel, an operator controlled unit with outside connecting wires where if each of the telephones 12*a*–12*d*** is "an outside phone" then the telephone substation may be part of the utilities communication system. Preferably, as the system as special utility in a hotel or motel each of the telephones is located in a room and hence communication can be provided between the substation 11 and the telephones 12 independently of each other.

One form of building where it is extremely desirable to provide information of the condition of each location where a telephone is positioned, is a hotel or motel with the information being instantly available at a front desk and according to the instant invention, the information is presented in a panel 16, denoted front desk unit in the drawing. Another area where it is desirable to have information of the status of the rooms is at a housekeeping control center which has charge of the maids for cleaning the rooms and thus, as shown, a panel denoted housekeeper's unit is provided and indicated by the reference numeral 17.

The front desk panel 16 has a row consisting of a first indicating light 18*a*, a second indicating light 19*a* and a two position switch 20*a* connected by leads 21*a* to its status unit 14*a*. Similarly, there is a second row having indicating lights 18*b*, 19*b* and switch 20*b* together with leads 21*b* connected to its status unit 14*b*. A third row is connected by leads 21*c* to its status unit 14*c* while leads 21*b* of a fourth row are connected to its status unit 14*d*. The housekeeping panel also has rows with each row consisting of just two indicating lights with the first row of indicating lights 22*a* and 23*a* being connected by leads 24*a* to its status unit 14*a* while the other three rows are connected by leads 24*b*, 24*c* and 24*d* to their status units 14*b–d*, respectively.

It will be understood that each of the rows at the front desk and housekeeping panels may be provided with identifying indicia such as room numbers and that the indicating lights for each room or row in both panels will have the same indication. Furthermore, it has been found that the indicating means such as lights 18*a* and 22*a* may be advantageously colored red while indicating lights 19*a* and 23*a* are colored green. By different combinations of energization of the lights including intermittent or flashing energization, a plurality of conditions may be indicated.

The manually operable switch 20*a* is used to control the selection of the connection of telephone 12*a* to either the telephone substation 11 or to the signaling system while the switches 20*b*, 20*c* and 20*d* also perform independently the same operation for the telephones 12*b*–12*d*. Moreover, each of the status units 14 is identical in construction and may be positioned whenever convenient between the telephone substation 11 and the telephones 12. Also if desired more than one housekeeping panel may be provided.

Referring to FIG. 2, there is shown an electrical schematic diagram of the status unit 14*a* enclosed within the dotted line 14′ and for convenience the various previously mentioned parts are indicated by the same reference numeral as those associated with the telephone 12*a*. Accordingly, there is the telephone 12*a*, the telephone substation 11 and the first row of indicating and control devices at the front desk, namely, indicating light 18*a* and 19*a* together with two position switch 20*a*. The housekeeping unit also has its first row of indicating lights 22*a* and 23 shown.

For supplying electrical power to the signaling system there are leads 25 and 26 connected to a source of power which may be 110 volts, 60-cycle AC. However, it will be understood that other and different power sources may be employed. Connected across the two leads is a motor 27 which operates a cam 28 for periodically closing a switch 29 in order to provide intermittent power in a lead 30 for use when a flashing signal is desired as will be hereinafter more fully explained.

The components, shown in their solid line position with the switch 20*a* being open, causes the status unit to connect the wires 15*a*from the telephone substation to the wires 13*a* of the telephone through a pair of relay switch arms 31*a* and 31*b* that are operated by relay coil 31*c*. The system now functions as a telephone system completely isolated from the signaling system.

When it is desired to terminate the telephone system and energize the signaling system for a room, the switch 20*a* is closed which connects the coil 31*c* across the power leads 25 and 26 and causes switch arms 31*a* and 31*b* to assume their dotted line position. This open circuits the connection between the telephone and the substation and also energizes the indicating lights 18*a* and 22*a* by a path that includes switch 20*a* and a relay switch arm 32*a* operated by relay coil 32*b* the latter presently not being energized. Such a signal or condition of the indicating lights may be used to indicate to the front desk unit and the housekeeper's unit that the status of that room has become empty or unoccupied and needs cleaning in order to be rented again.

When a maid is assigned to clean the room the information of her presence in the room is transmitted to the signaling system by the removing of the receiver 33 of the telephone 12*a* from its base which causes telephone switch 34*a* to assume its dotted line position wherein it electrically connects the two wires 13*a* together. This completes a circuit from the lead 25 through switch arm 31*a*, switch 34*a* and switch arm 31*b* to energize a relay coil 35*a*. Energization of coil 35*a* causes two switch arms 35*b* and 35*c* to assume their dotted line positions and the arm 35*b* energizes relay coil 32*b* which shifts its switch arm 32*a* to its dotted line position to deenergize the lights 18*a* and 22*a* and provide a locking circuit for the coil 32*b*. Switch arm 35*c*, by being in its dotted line position connects intermittent power lead 30 through to the indicating lights 19*a* and 23*a*. Accordingly with the receiver 33 removed from its base at the front desk and housekeeping unit is a flashing green light 19*a* and 23*a*.

Upon the maid finishing cleaning of the room, the receiver 33 is replaced on its base causing switch 34*a* to assume its solid line position breaking the connection between the wires 13*a* and deenergizing coil 35*a* to enable the switch arms 35*b* and 35*c* to assume their solid line positions. Switch arm 35*c* terminates the connection to intermittent power lead 30 and effects a path to supply continuous power to the indicating lights 19*a* and 23*a* through the dotted lines position of switch arm 32*a*. Continuous illumination of indicating lights 19*a* and 23*a* may be advantageously employed to indicate the condition that the room is clean and is now ready for renting.

When the room is rented, the front desk shifts the switch 20*a* to its solid line position which deenergizes the relay coils 31*c* and 32*b* and the switch arms 31*a*, 31*b* and 32*a* all assume their solid line position and both indicating lights 19*a* and 23*a* become deenergized. Thus all lights out provide a condition of the indicating lights that may be used to show that the room is occupied. Moreover, the shifting of the switch 20*a* disconnects the signaling system for the telephone and effects connection thereof to the telephone substation 11.

The above procedure relates to a check out procedure wherein a room becomes unoccupied by one party and then is subsequently occupied by a different party. In a "stay over" situation where the same party occupies the same room, the room is still required to be cleaned and such information should be provided to the front desk and the housekeeper's unit. In this situation the maid, upon entering the room to clean it, uses the telephone to call the front desk unit which simultaneously closes the switch 20*a* while the telephone is in use and hence switch 34*a* is in its dotted line position. This disconnects the telephone from the telephone system and causes the energization of all three relay coils to effect an intermittent energization of the indicating lights 19*a* and 23*a* showing the status that the room is being cleaned. The front desk unit then returns the switch 20*a* to its solid line position while the receiver is off its base with power to maintain the coil 35*a* energized being supplied through the switch 34*a* from the leads 25 and 26 and power for energizing the coils 31*c* and 32*b* being supplied through the switch arm 35*b*.

Upon the maid finishing cleaning of the room, the indicating lights are returned to their deenergized condition by the maid replacing the receiver 33 on the base, causing the switch 34*a* to open the circuit between the wires 13*a* to deenergize all relay coils. The indicating lights for this room are now both extinguished and indicate that the room is clean and occupied.

Moreover, the replacing of the receiver 33 on its base causes the telephone to be automatically connected to the telephone system and disconnected from the signaling system.

It will be understood that each of the status units 14*b*–14*d* is identical to the status unit 14*a* and causes the same functions to be performed by its telephones 12*b*–12*d* to effect the indicating lights at both panels. Accordingly, each telephone may be individually shifted into either the telephone system or the signaling system independently of all the other telephones.

The status units must be electrically located between the telephone substation and the telephones and its physical location in a building may be dictated by many factors such as accessibility to the wires, nearness to front desk and housekeeping units, convenience and ease of mounting, unobstrusiveness, etc.

Shown in FIG. 3 is a modification of the status unit in which it is desired, if the power to the leads 25 and 26 is 110 v., 60-cycle AC, to energize the relay coil with lower voltage DC. Thus, there is provided a transformer 36 and rectifier 37 connected as shown with filters (not shown) being added if required.

While only four telephones have been shown in the specific embodiment of the invention heretofore described, the present system contemplates using many more telephones and associated parts.

It will accordingly be appreciated that there has been disclosed a combined telephone and signaling system which may selectively connect a telephone positioned at a remote location for telephonic communication or for transmitting information to change the indicators in the signaling system. The system includes a plurality of telephones each located at separate locations and at least one indicator panel having an indicator means and a control switch for each telephone positioned at a convenient area. The control switch is used to select in which system the telephone is to be connected and also to impart information into the system to alter the condition of the indicating means. Though both systems function when selected independently of the other the combined system enables both functions to be obtained in an especially economical system through the use of the same wires and telephone for performing both functions.

Variations and modifications may be made within the scope of the claims and portions of the improvements may be used without others.

We claim:

1. A system for selectively providing either telephonic communication with a telephone substation or signal information to an area comprising a location having a telephone having wires connected thereto and a signaling system having indicating means located at the area remote from said location for providing any one of a plurality of visually discernible different conditions at said area, a control switch having first and second positions, means operable by the control switch for electrically connecting the telephone wires to the telephone substation in the first position of said control switch and electrically disconnecting the signaling system from the telephone wires and for connecting the telephone wires to the signaling system in the second position of said control switch and electrically disconnecting the telephone wires from the telephone substation, said telephone having a manually operable switch which in one position maintains the telephone wires disconnected and in its other position maintains the telephone wires electrically connected and connecting means in said system for causing the indicating means to assume a first condition for the control switch being in its second position with the telephone switch being simultaneously in its one position, for causing the indicating means to assume a second condition with the telephone switch being at its other position simultaneously with the control switch being at its second position and for causing the indicating means to assume a third condition with the telephone switch being returned to its one position simultaneously with the control switch being in its second position.

2. The invention as defined in claim 1 in which the indicating means includes a plurality of electrically energizable elements, in which there is a source of electrical energy and in which the connecting means connects different elements and the source for at least two of the different conditions.

3. The invention as defined in claim 1 in which the indicating means includes two separably electrically energizable lights, in which there is a source of electrical energy, in which the connecting means for the first condition connects the source to one light to energize it, in which the connecting means for the second condition connects the other light intermittently to the source and in which the connecting means for the third condition connects the other light continuously to the source.

4. The invention as defined in claim 1 in which the connecting means causes the indicating means to assume one of the conditions upon operation of the control switch from its first position to its second position simultaneously with the telephone switch being in its other position and for retaining said condition with the return of the control switch to its first position while the telephone switch is in its other position.

5. The invention as defined in claim 4 in which the connecting means upon the shifting of the telephone switch from its other position to its one position with the control switch being in its one position causes the signaling system to be disconnected from the telephone wires.

6. The invention as defined in claim 1 in which there is another indicating means identical to the first mentioned indicating means located at a second area remote from the first mentioned area and in which the connecting means is interconnected to the second indicating means to cause it to have a condition which is identical to the condition of the first indicating means.

7. The invention as defined in claim 1 in which there is a plurality of locations each having a telephone and a signaling system, in which each signal system includes indicating mean, a control switch and connecting means and in which the indicating means and the control switch for each system is located at the first area.

8. The invention as defined in claim 7 in which there is a second indicating means for each system, in which the second indicating means are located at a second area remote from the first area and in which the connecting means is interconnected with the second indicating means to cause them to assume conditions identical to the conditions of the first mentioned indicating means.

9. The invention as defined in claim 8 in which the control switch for each system is independently operable from the other control switches and in which each connecting means is independently operable from the other connecting means whereby each telephone may be independently selected to provide either communication or signal information.

10. The invention as defined in claim 1 in which the connecting means includes a first relay means operable by the control switch for electrically disconnecting the telephone wires from the telephone substation and connecting them to the system and effecting the first condition of the indicating means, a second relay means operable by the telephone switch being in its second position for effecting the second condition of the indicating means and a third relay means operable by the telephones switch being in its first position for effecting the third condition of the indicating means.